United States Patent [19]

Smith

[11] 4,228,459
[45] Oct. 14, 1980

[54] ELECTRONIC BLACK MATRIX CIRCUITRY

[75] Inventor: Leland B. Smith, Englewood, Colo.

[73] Assignee: Unirad Corporation, Englewood, Colo.

[21] Appl. No.: 872,542

[22] Filed: Jan. 26, 1978

[51] Int. Cl.³ .................. H04N 5/30; H04N 5/14; A61B 10/00
[52] U.S. Cl. .................. 358/112; 358/166; 358/242; 128/660
[58] Field of Search .............. 358/112, 242, 160, 188, 358/166, 165, 138, 150, 37, 33, 21, 283; 315/383-386; 128/2 V, 660-663; 73/626, 624, 625; 340/755, 793, 812, 791, 5 MP, 723, 732, 734

[56] References Cited

U.S. PATENT DOCUMENTS

| 2,034,704 | 3/1936 | Nakashima et al. | 358/242 |
| 2,798,114 | 7/1957 | Schlesinger | 358/138 |
| 2,823,258 | 2/1958 | Schlesinger et al. | 358/242 |
| 3,414,677 | 12/1968 | Quinlan | 358/138 |
| 3,881,466 | 5/1975 | Wilcox | 73/626 |
| 3,909,519 | 9/1975 | Page | 358/107 |
| 3,911,730 | 10/1975 | Niklas | 73/626 |
| 3,919,683 | 11/1975 | Itamura et al. | 73/626 |
| 4,038,687 | 7/1977 | Schneider et al. | 358/165 |
| 4,127,034 | 11/1978 | Lederman et al. | 73/626 |
| 4,137,777 | 2/1979 | Havere et al. | 73/626 |

FOREIGN PATENT DOCUMENTS 1285837  8/1972  United Kingdom .

Primary Examiner—John C. Martin
Attorney, Agent, or Firm—Fay & Sharpe

[57] ABSTRACT

An electronic circuit is used to interrupt the video signal going to a T.V. monitor about 500 times per scan line. Each interruption causes a black spot in the display. The black lines between scan lines on the T.V. screen cooperate with the black spots in each scan line to form electronically a black matrix background for the T.V. picture. The black matrix enhances the picture quality making a sharper, clearer picture.

28 Claims, 3 Drawing Figures

ELECTRONIC BLACK MATRIX CIRCUITRY

BACKGROUND OF THE INVENTION

The present invention relates to electronic apparatus for improving the visual display on a T.V. screen by electronically creating a black matrix or mesh surrounding the individual luminescing dots. In the past, a black and white T.V. picture was a series of horizontal lines of light whose intensity varied along each line. Each horizontal line was separated by a thin, unilluminated area which appeared as a thin black line. Because such a T.V. picture in each field had a series of thin black horizontal lines, one above the other in the vertical direction, the eye of the viewer was forced to integrate the display in the vertical direction. However, because the light spots along the horizontal line ran together, the eye was not forced to integrate horizontally. By creating a series of vertical lines similar to the horizontal lines in a standard T.V. picture, the present invention forces the viewer's eye to integrate the image uniformly in both spatial directions. Such a picture, with the black mesh background, produces a sharper, clearer image and a more viewable display.

Not only does the periodic disruption of a horizontal scan cause a sharper image but the abrupt boundary definitions between light dots helps eliminate phosphor light blooming. In particular, when the video input is blacked out between each pixel of the horizontal display, a large dynamic range signal is less likely to cause phosphor light blooming. When the rate at which the blackout level is switched on and off approximates the video band width of the display system, then the potential for phosphor light blooming is decreased even further.

Previously, black mesh or matrix backgrounds were produced by placing a black grid on the face of the cathode ray tube. This procedure is expensive. The present invention, with the addition of a simple and low-cost, electronic circuit or circuit chip to the electronics of T.V., eliminates the need for a precision manufactured black matrix grid and the labor to install and align it. Although this circuit has its easiest application to black and white televisions which have a continuum phosphor on a screen, it is also adaptable to color T.V. By using an electronic black matrix, such as the present invention imposes, the precision in placing the phosphor dots can be reduced.

A major application of the present invention is in medical diagnostic equipment. This field commonly uses black and white T.V. monitors with a gray scale but demands great visual accuity—accuity not just to the human eye but to cameras which take photographs of the visual display on the T.V. screen. Photographic images from a T.V. screen with the black matrix background are more viewable to the eye and produce an image which is more easily and fully resolved. Such an image also can produce more accurate measurements of distances and sizes. Photographs from T.V. images without the black matrix tend to be striped which produce photographs that are relatively easily resolved perpendicular to the scan lines but which are more difficult to resolve along the scan lines.

A primary use for the present invention is to display the output from ultrasonic diagnostic equipment. Ultrasonic diagnostic equipment is able to make a very precise electronic record of the object scanned by the ultrasonic array. However, this very accurate information can be lost on a T.V. monitor which does not have excellent visual resolution in all directions. The present invention greatly improves the accuracy with which ultrasonic diagnostic equipment can view the internal areas of a patient. The invention makes a great improvement in the viewability of the display very inexpensively. To achieve similar improvement by modifying the ultrasonic diagnostic equipment, in particular the control circuitry or the transducer's array, would require a far greater cost that increases in complexity.

DESCRIPTION OF THE PREFERRED EMBODIMENT

In the standard T.V. image, there are about 480 horizontal scan lines separated by about 479 thin black lines of unirradiated phosphors between adjoining scan lines. These black lines produce the horizontal lines of the black matrix. The present invention adds to the standard T.V. a means for periodically blacking out the signal during each sweep of the electron beam. To produce a square matrix, it blacks out the electron beam about 640 times per sweep. By synchronizing the means for periodically blacking out the signal with the beginning of the sweep line, each pixel of light is directly below the pixels in preceding lines. In this manner, the blacked out points along each line form a series of vertical black lines causing the matrix to appear as a number of vertical black lines intersecting a number of horizontal black lines.

Figure 1:
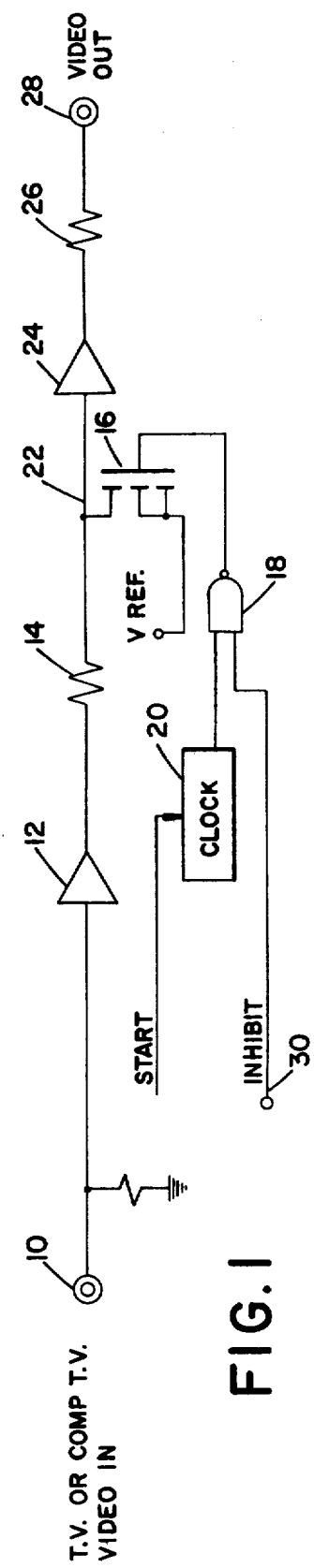
FIG. 1 shows a circuit diagram in accord with the present invention for electronically applying a black matrix to an analog T.V. or composite T.V. video signal.

FIG. 1 illustrates a circuit for electronically producing a black matrix background. A T.V. or composite T.V. video signal is received at input 10. The signal is buffered by buffering means 12, such as an amplifier which has a very low output impedance. The output impedance of the buffering amplifier should be substantially lower than resistive element 14. A typical value of resistive element 14 would be 270 ohms.

The video signal is then subject to a periodic blacking out means. In FIG. 1, this means is a D-MOS switch which is controlled by clock 20. Clock 20 produces a symmetric square wave on the order of 12 megahertz. A square wave of 12 megahertz produces 640 pixels separated by 639 black cells, the length of the pixel and black cell being approximately equal. The D-MOS switch, in time with the clock pulse, switches a reference voltage which is sufficient to cause a black reference for full scale video onto video line 22. A typical reference voltage is about 7/10 of a volt. Thus, the data within each scan line is blacked out between each pixel of display information.

The video signal on line 22 is buffered by a second buffering means, such as amplifier 24, to match the impedance of the transmission line to a T.V. monitor. Normally a T.V. monitor has a 75 ohm video path. A typical value for resistive element 26 would be 75 ohms.

Thus, the signal at the video output 28 is correctly buffered for a standard T.V.

When a composite T.V. signal is being chopped, it is necessary to prevent chopping of the composite portion of the synchronization system. To achieve this, a NAND gate 18 is used which prohibits the clock pulse signals from passing unless there is also a signal on the inhibit line 30. The inhibit signal blocks NAND gate 18 until the composite portion of the video has been transmitted on line 22, then allows the clock pulse to pass. This will destroy the symmetry of the clock pulses slightly because the inhibit signal will tend to decrease the size of the blacked out region slightly.

Further, the clock pulse generator 20 is synchronized with the sweep generator of the T.V. monitor. If the clock pulses fail to start in the same phase of the beginning of each sweep, the vertical black matrix lines will not be straight. Thus, there is a means which starts the clock 20 at a specific phase at the beginning of each sweep or, conversely, there may be a means on the T.V. sweep generator controlled by the clock so that the sweep can only start at a specific position on the clock pulse.

Figure 2:
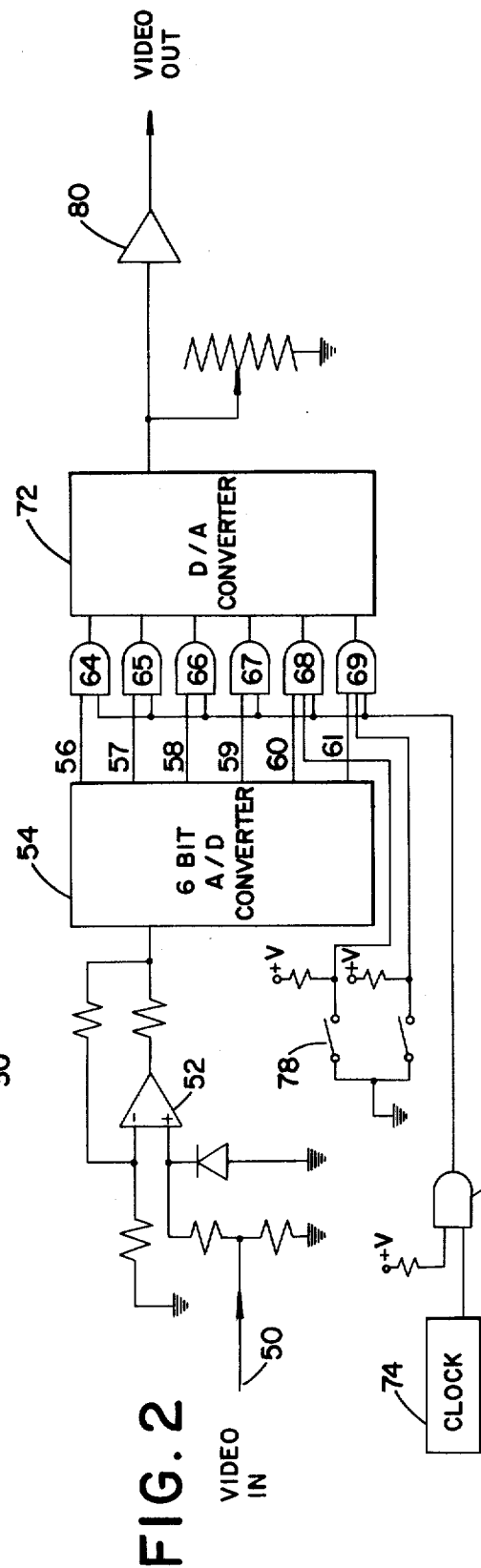
FIG. 2 shows a circuit diagram in accord with the present invention for applying a black matrix to a digital T.V. or composite T.V. video signal.

A second embodiment of the invention is shown in FIG. 2. This embodiment works with a digital video signal rather than the analog video signal of FIG. 1. The analog to digital converter produces a digital output on a set of lines—one for each binary digit. The signals on each line are a set of on/off signals whose duration is determined by the clock pulses of a clock circuit. The digital output passes through a gating circuit which cuts the duration of each digital signal in half. The gating circuit then allows the digital signal to pass for half a clock pulse and for the other half of the clock pulse replaces the signal with the digital signal to cause a black pixel. The digital-to-analog converter receives the digital signal for about half the normal duration, and a digital signal corresponding to a blacked out region for the other half of the duration. When the digital-to-analog converter converts these signals back into an analog signal, the signal appears as a series of analog values interspersed among a series of blacked out values.

The circuit of FIG. 2 again has a buffering amplifier 52 to buffer the video signal at input 50. Differential amplifier 52 is illustrated with a voltage divider for the input video signal and with a diode which prohibits the video signal from taking a negative value. Further, the amplifier is illustrated with a feedback loop to the inverted input. The buffered input is then fed to a six-bit analog-to-digital converter 54. The digital signal is a series of six high and low pulses appearing on lines 56 through 61, respectively, which taken together represent an analog input amplitude in a digital form. Lines 56 through 61 are connected to one input of AND gates 64 through 69, respectively. AND gates 64 through 69 have their outputs connected to a digital-to-analog converter 72 which converts the digital signals back to analog signals. Although it is possible to use either current-mode or voltage-mode digital-to-analog converters, voltage-mode converters have been found to be more desirable because they reduce interference from parasitics and other system time constants.

The other input of each of the AND gates 64 through 69 is connected to a chopping signal means. In this example, the chopping means is a clock generator 74 and an AND gate 76. AND gate 76 acts to transform the clock pulses into signals of only two amplitudes, either a high voltage amplitude or a low voltage amplitude which correspond in amplitude to the high and low voltages on output lines 56 through 61. When the output of AND gate 76 is high, then AND gates 64 through 69 will have a high output if the input on the respective one of inputs 56 through 61 is high and a low output if the respective input is low. When the output of AND gate 76 is low, the output of AND gates 64 through 69 are all low. When the outputs from AND gates 64 through 69 are all low, the digital-to-analog converter 72 will produce a signal indicative of a black region. When the output from AND gate 76 is high, AND gates 64 through 69 will pass or low pulses which digital-to-analog converter 72 transforms into an analog brightness amplitude. A pair of switches 78 may be used to connect to ground the third input to AND gates 68 and 69. This removes the least two significant digits of the six-bit digital brightness signal. This reduces by one-quarter the number of shades of gray which are available in the final output video signal.

The output of the digital-to-analog converter 72 is again fed through a buffering amplifier 80 which matches the output impedance to the input impedance of the T.V. monitor—typically 75 ohms.

It will be noted then that if the clock pulse generator runs at 12 megahertz, there will be 640 pixels of data separated by 639 blacked out pixels in each scan. If the analog-to-digital converter also converts the analog input signal into 640 digital representations per scan, then no digital information will be lost. However, if more than 640 conversions of analog-to-digital data are made per scan, then some of the data will be lost. To overcome the problem of matching the clock frequency to the rate at which the analog-to-digital converter converts analog signals into digital signals, AND gate 76 can be controlled directly by the analog-to-digital converter 54. Conversely, clock 74 can control analog-to-digital converter 54. It is desirable to have 400 to 700 blacked out pixels per line in order to produce a roughly square black matrix although a larger or smaller number of black pixels may be desirable for some uses. Accordingly, the analog-to-digital converter should be able to make 400–700 conversions per scan line.

Figure 3:
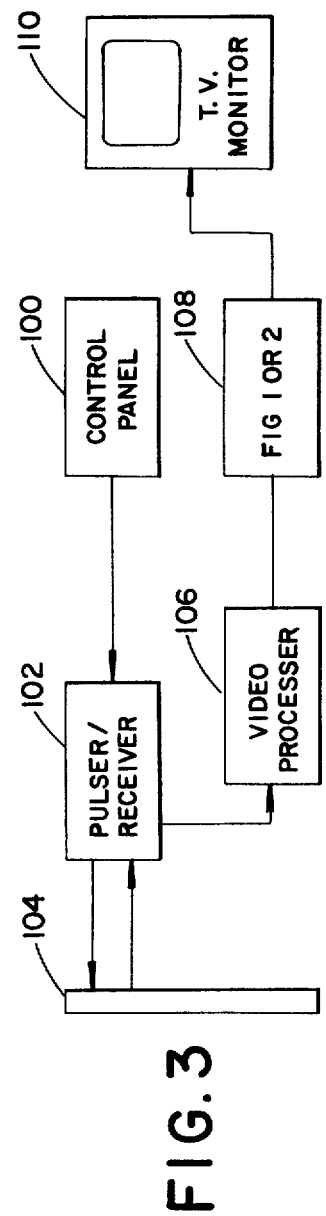
FIG. 3 shows the circuit diagram of FIGS. 1 and 2 in combination with ultrasonic scanning equipment.

FIG. 3 illustrates the electronic black matrix insertion circuit in an ultrasonic diagnostic system. Further details of such an ultrasonic diagnostic system are illustrated in such patents as U.S. Pat. Nos. 3,911,730, 3,881,466, and 3,919,683. In FIG. 3, there is a control panel 100 which selects the exact mode of operation of the diagnostic equipment. This control panel controls the pulser/receiver module 102. Pulser/receiver module 102 causes one or a group of transducers, typically on the order of four to eight in the transducer array 104, typically 64 transducers although the "array" 104 could be a single transducer, to be pulsed such that they produce an ultrasonic sound wave. The echo from the sound wave impinging upon transducer array 104 causes electrical signals which are sent back to the pulser/receiver unit and on to a video processing unit 106. The signals from each group are processed by the video processor 106 into one scan line of video data.

Pulser/receiver unit 102 then causes a different group of transducer elements to be pulsed to produce the information necessary for video processor 106 to produce a second scan line of video data. The output of video processor, a composite video signal, is fed to the input of circuit 108 which could be the circuit of either FIG. 1 or FIG. 2. The output of circuit 108 then goes to the input of a T.V. monitor 110 which provides the visual display of the patient or object scanned by the transducer array 104.

The above circuits are exemplary of the present invention. The specific embodiments as shown above are not intended to limit the present invention. Rather, the present invention includes the above specific embodiment as well as all of the equivalents thereto encompassed within the claims as follows.

I claim:

1. The method of improving the clarity or apparent resolution of a video display in ultrasonic diagnostic equipment comprising the steps of:
    (a) electrically pulsing transducers in a transducer array causing them to produce an ultrasonic sound wave;
    (b) receiving ultrasonic echoes with transducers in the array and converting the echoes to an electrical signal whose amplitude varies in time with the amplitude of the echoes;
    (c) transforming the electrical signal into a video signal;
    (d) periodically blacking out the video signal only when said video signal is not transmitting synchronization data; and
    (e) displaying the video signal on a video monitor wherein unirradiated lines between adjoining video sweep lines and periodically blacked out portions in the video sweep lines coact to form a black matrix superimposed on the video display.

2. The method of improving the video display in ultrasonic diagnostic equipment as set forth in claim 1 further including:
    (f) repeating the pulsing and receiving steps to produce a plurality of electrical signals;
    (g) in the transforming step, transforming each electrical signal into one scan line of the video signal; and
    (h) in the blacking out step, blacking out each scan line signal a plurality of times.

3. The method of improving the video display in ultrasonic diagnostic equipment as set forth in claim 2 wherein the steps of transforming includes transforming the electrical signals into analog video signals.

4. The method of improving the video display in ultrasonic diagnostic equipment as set forth in claim 2 wherein the step of blacking out is performed about the same number of times per scan line as the number of scan lines per video display.

5. The method of improving the video display in ultrasonic diagnostic equipment as set forth in claim 2 wherein the step of blacking out is performed 300 to 800 times per scan line.

6. The method of improving the video display in ultrasonic diagnostic equipment as set forth in claim 5 wherein the step of blacking out starts at the same position in every scan line and the blacking out occurs with the same periodicity in every scan line whereby the video display has a black matrix-like background, vertical lines of the matrix from the periodic blacking out of the scan lines and horizontal lines of the matrix from the spacing between scan lines.

7. A method of improving a video display in ultrasonic diagnostic equipment with a black matrix formed by inherently unirradiated lines between adjoining video sweep lines and periodically blacked out portions of the video sweep lines commensurate in width and spacing with the width and spacing of the unirradiated lines, the method comprising the steps of:
    (a) electrically pulsing transducers in a transducer array causing them to produce an ultrasonic sound wave;
    (b) receiving ultrasonic echoes with transducers in the array and converting the echoes to an analog electrical signal having an amplitude which varies in time with the strength of the echoes;
    (c) transforming the analog electrical signals into a sweep line of digital video signals.
    (d) periodically blacking out the digital video signal only when said video signals are not transmitting synchronization data;
    (e) repeating the pulsing and receiving steps to produce a plurality of sweep lines; and
    (f) displaying the plurality of sweep lines on a video monitor wherein the video display includes a matrix of blacked out regions.

8. A circuit for electronically superimposing a black matrix on a video display to improve the clarity or apparent resolution of the display, the circuit comprising input means for receiving a composite video signal, which composite video signal comprises an image portion for conveying image pixel intensity information and a synchronization portion for conveying synchronization information;
    means for blanking the image portion of the video signal periodically during each video sweep line without significantly disturbing the synchronization information conveying function of the synchronization portion; and
    output means operatively connected with said blanking means for providing the periodically blanked video signal to a video display, whereby unirradiated lines between adjoining video sweep lines and periodically blanked portions of the video sweep lines coact to form the black matrix on the video display.

9. The circuit as set forth in claim 8 wherein said blanking means comprises switching means for periodically imposing during each scan line a reference onto the image portion of the video signal, which reference is of a magnitude to cause a video monitor to produce a black output, whereby the periodically blanked video signal represents a series of grey tones separated by a series of black tones.

10. The circuit as set forth in claim 9 further comprising a pulse generating means for causing the switching means to switch the reference into the video signal 400 to 700 times per sweep line.

11. The circuit as set forth in claim 8 further comprising means for pulsing an array of transducer elements, N elements at a time, wherein N is an integer of at least one, to produce an ultrasonic output wave from said array of at least one transducer element said transducer elements producing signals upon receiving ultrasonic echoes;
    means for receiving signals produced by said transducer elements upon receiving ultrasonic echoes;
    video processing means connected operatively to said receiving means for converting said signals into the composite video signal, said video processing means connected operatively to said input means, and
    T.V. monitor means connected operatively to said output means.

12. A video circuit comprising input means for receiving a composite video signal, which composite video signal comprises an image portion for conveying image pixel intensity information and a synchronization portion for conveying synchronization information; analog-to-digital converting means for converting the video signal into a digital signal, said analog-to-digital converting means operatively connected with said input means, said analog-to-digital converting means having a plurality of ouput lines each line corresponding to one digit of the digital signal; means for blanking the image portion of the video signal periodically during each video sweep line without significantly disturbing the synchronization information conveying function of the synchronization portion, said blanking means comprising gate means operatively connected with said output lines for periodically passing and blocking the digits of the digital signal, said gate means being adapted to be connected with a video display.

13. The circuit as set forth in claim 12 further comprising the digital-to-analog converting means operatively connected with said gate means for converting digits passed by the gate means to analog signals and for converting the output of the gate means when the digits are blocked to an analog reference voltage of a magnitude to cause a video monitor to produce a black output.

14. A video circuit comprising:
input means for receiving a video signal which video signal comprises a plurality of scan lines of data;
switching means for periodically switching a reference onto the video signal, said reference having a magnitude to cause the video signal to indicate a black output, said switching means being operatively connected with said input means;
inhibit means for inhibiting said switching means from switching said reference onto the video signal when said video signal is transmitting synchronization data, said inhibiting means being operatively connected with said switching means; and
output means operatively connected with said switching means for providing an interrupted video output signal.

15. The circuit as set forth in claim 14 wherein said switching means is a D-MOS transistor.

16. The circuit as set forth in claim 14 further including first buffering means for matching the impedance of the input video signal to that of said switching means, and second buffering means for matching the impedance of the output video signal to the input of a T.V. monitor.

17. The circuit as set forth in claim 14 further comprising pulse generating means for generating a series of pulses for causing said switching means to switch said reference voltage into the video signal periodically, said pulse generating means being operatively connected with said switching means.

18. The circuit as set forth in claim 17 further including means to synchronize said pulse generating means in the beginning of each sweep signal such that each scan line of data starts at the same relative position within the clock pulse cycle.

19. The circuit set forth in claim 17 wherein said pulse generating means comprises a logic gate and a clock pulse generator operatively connected to one input of the logic gate, the logic gate producing the series of clock pulses in the form of a series of high and low pulses forming a square wave, said inhibiting means operatively connected with another input of the logic gate.

20. The circuit as set forth in claim 19 wherein said clock pulse generator generates clock pulses in the range of 8 megahertz to 13 megahertz.

21. A video circuit comprising:
an input for receiving a video signal which video signal is made up of a plurality of scan lines of analog data;
analog-to-digital converting means for converting the analog data into a digital signal, said converting means operatively connected with said input means,
blocking means for periodically blocking the passage of digital signals within one of the scan lines;
output means operatively connected with the blocking means for providing an interrupted video signal.

22. The circuit as set forth in claim 21 wherein said analog-to-digital converting means has a plurality of digital output lines, each digital output line corresponding to one digit of the digital signals; and wherein said blocking means comprises gate means on each of said digital output lines for selectively passing the digits of the digital signals.

23. The circuit as set forth in claim 22 wherein said gate means is a plurality of AND gates, each of said digital output lines connected to the input of one of said AND gates, said periodic enabling means connected to a second input of each AND gate, each AND gate having an output operatively connected to said output means.

24. The circuit as set forth in claim 22 further comprising periodic enabling means operatively connected with said gate means for periodically enabling the gate means to pass the digital signals to the output.

25. The circuit as set forth in claim 24 wherein said periodic enabling means is further operatively connected with said analog-to-digital converter for controlling the rate of analog-to-digital conversions.

26. The circuit as set forth in claim 24 further comprising digital-to-analog converting means for converting the digital signals to analog signals, said digital-to-analog converting means operatively connected with the gate means for receiving digital signals therefrom.

27. The circuit as set forth in claim 26 further comprising a first buffer means operatively connected between said input means and said analog-to-digital converting means for matching the video signal to the analog-to-digital converting means, and a second buffer means operatively connected between said digital-to-analog converter, said output means for matching the output impedance of the said digital-to-analog converter to the input impedance of a T.V. monitor.

28. An ultrasonic diagnostic apparatus comprising:
an array of transducer elements for producing ultrasonic waves and producing signals upon receiving ultrasonic echoes;
means for pulsing transducer elements of the array to cause an ultrasonic wave to be produced, said pulsing means operatively connected to said array;
means for receiving signals from the array, said receiving means operatively connected to said array;
video processing means operatively connected to the receiving means for converting said signals into a video signal;
switching means for periodically switching a reference voltage onto the video signal, the reference voltage being of a magnitude to cause the video signal to indicate a black output, said switching being operatively connected with said video processing means;

inhibit means for inhibiting the switching means from switching said refernce voltage onto the video signal when said video signal is transmitting synchronization data, said inhibiting means being operatively connected with said receiving means; and a video monitor for transforming the video signal into a visual image, said video monitor being operatively connected with said switching means.

* * * * *